United States Patent Office 3,472,831
Patented Oct. 14, 1969

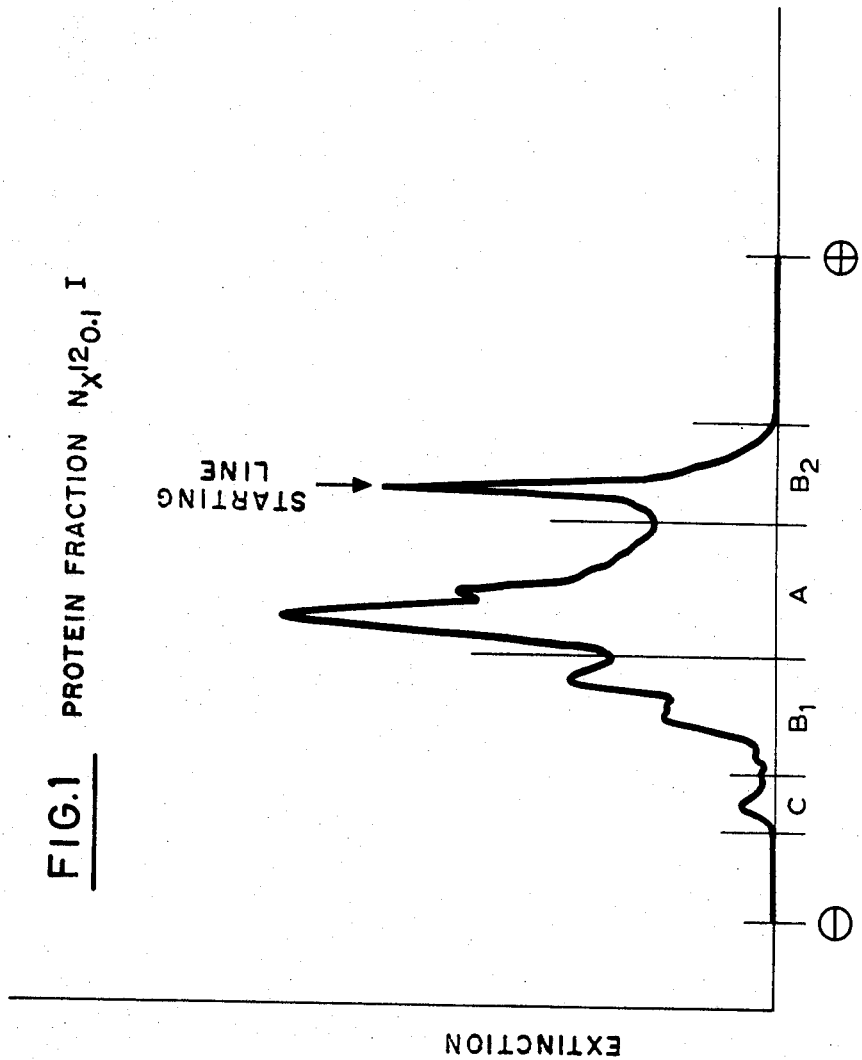

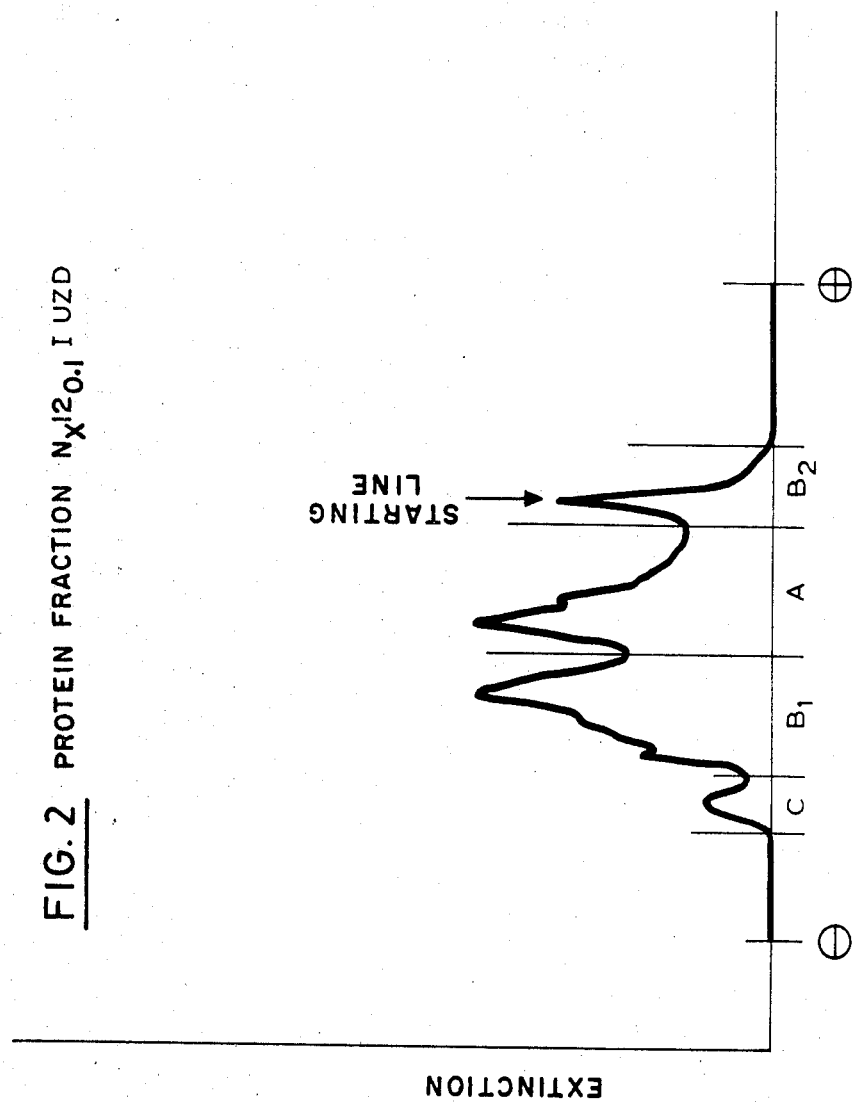
FIG. 2 PROTEIN FRACTION $N_x^{12}0.1$ I UZD

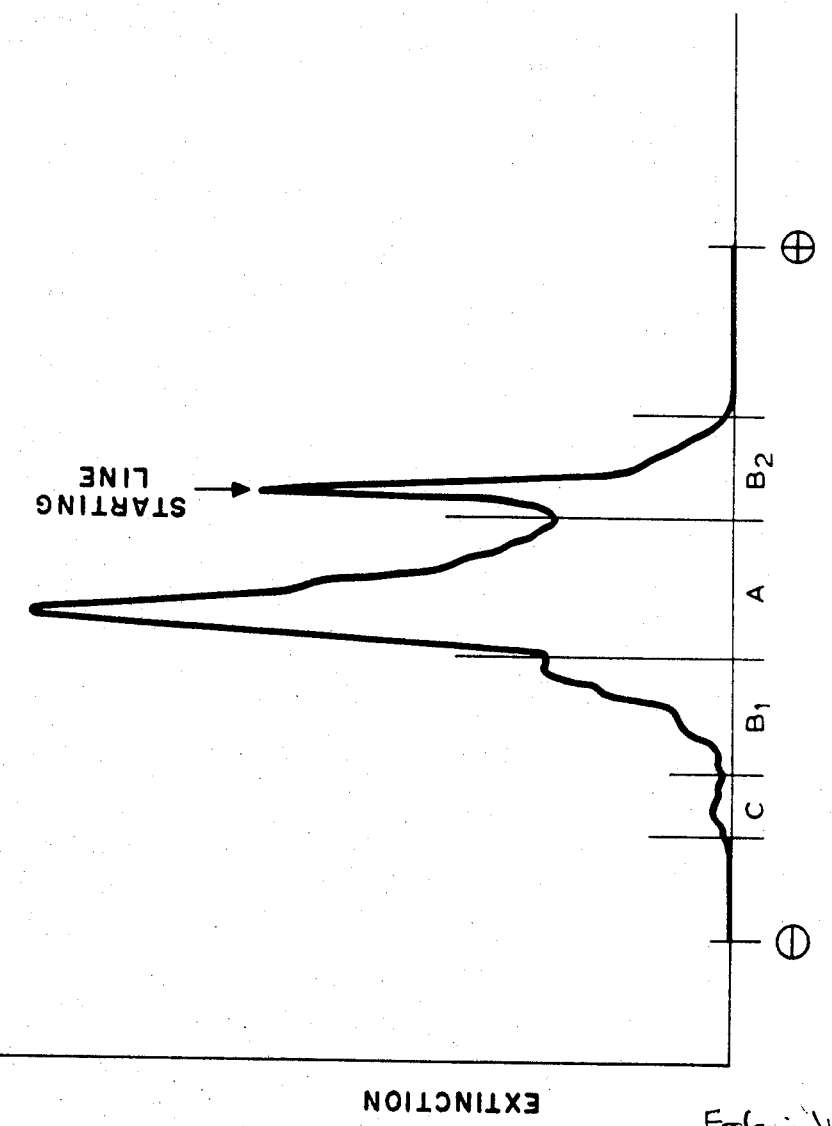

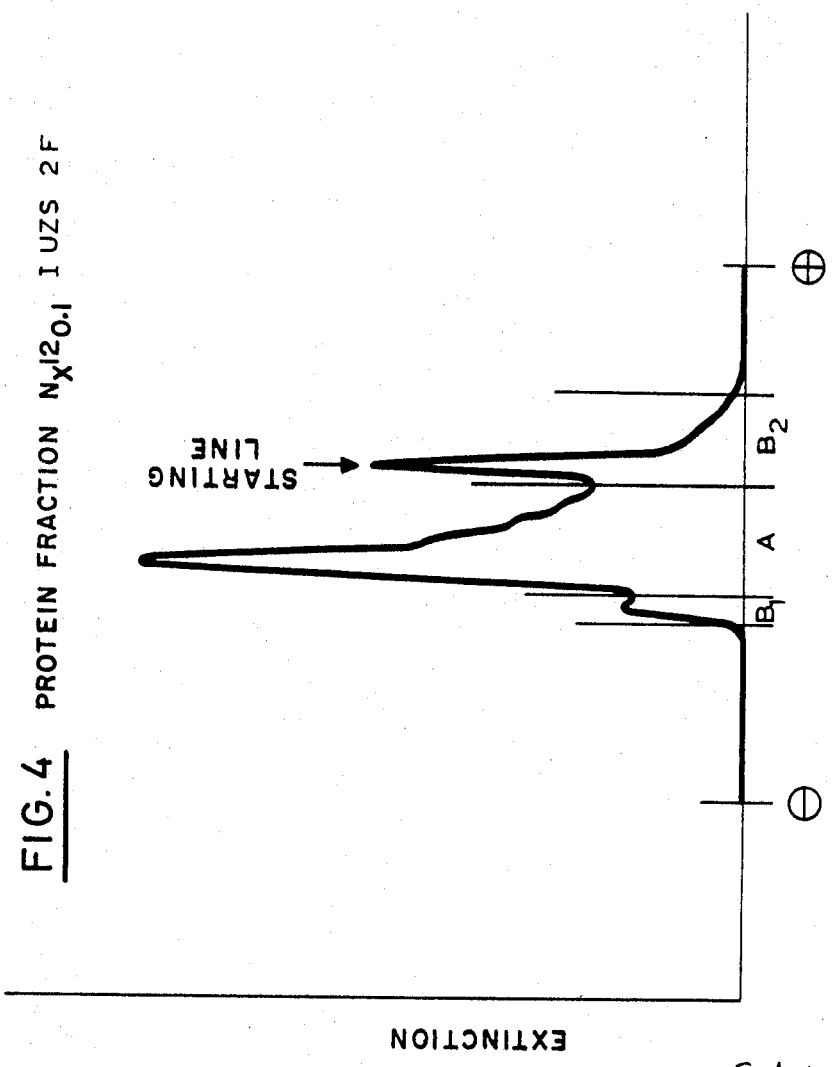

3,472,831
PROCESS FOR PURIFYING MISTLETOE PROTEINS BY ULTRACENTRIFUGATION
Frederic Vester, Munich-Solln, Germany, and Heinz Majer, Basel, and Johannes Mueller, Arlesheim, Switzerland, assignors to Ciba Corporation, New York, N.Y., a corporation of Delaware
Filed Feb. 7, 1966, Ser. No. 525,684
Claims priority, application Switzerland, Feb. 19, 1965, 2,313/65
Int. Cl. C07g 7/00; A61k 27/00
U.S. Cl. 260—112  8 Claims

ABSTRACT OF THE DISCLOSURE

The present invention is based on the unexpected observation that the ballast substances and especially the atypically toxic portion can be removed from protein fractions obtainable by the process of Belgian Patent No. 646,095, granted Apr. 3, 1964, to Frederic Vester, particularly the protein fractions $Nx\ 11_{0.04}$ or $Nx\ 12_{0.04}$, such as $Nx\ 11_{0.1}$, $Nx\ 11_{0.35}$, $Nx\ 12_{0.35}$, or their purified fractions, such as $Nx\ 12_{0.1}$ I or $Nx\ 12_{0.35}$ I, by ultra-centrifuging an aqueous solution of these protein fractions and isolating the tumour-inhibiting protein fraction in a highly purified form from the sediment.

---

Belgian Patent No. 646,095 granted April 3, 1964, to Frederic Vester, provides a process for the production of a purified protein having an anti-tumour action from plant material of Viscum species, above all *Viscum album* L. *sensu latiore* or Loranthus species especially *Loranthus europaeus* L., classified together under the designation "mistletoe." According to said process clear press juice from mistletoe freed from its sludge-like impurities, or an equivalent aqueous extract as well as dialysates or the dry-substances thereof, are salted out with an aqueous ammonium sulphate solution, and the protein fraction obtained at an ammonium sulphate molarity from about 1 to 1.9 is dialyzed against water, and, if desired, the water-insoluble portion of the retentate is salted-in with an aqueous ammonium sulphate solution or another salt solution up to a maximum molarity of 0.4, and, if necessary, the resulting protein fraction is purified on an adsorbent, such as a polydextran gel, advantageously over 2 steps, namely first on a block and then on a column of the adsorbent. The protein obtained by salting out, followed by dialysis, called Nx and Nx 1, respectively, and its fractions $Nx\ 11_{0-0.4}$ and $Nx\ 12_{0-0.4}$ obtained after salting-in, particularly the fractions $Nx\ 11_{0.1}$, $Nx\ 11_{0.35}$, $Nx\ 12_{0.1}$ or $Nx\ 12_{0.35}$, as well as the further purified protein fractions, such as $Nx\ 12_{0.1}$ I or $Nx\ 12_{0.35}$ I, possess pronounced tumour-inhibiting properties; however, they are still contaminated with inactive proteinic material and more especially with atypically toxic protein material that does not inhibit tumours.

By means of an acetylcellulose film electrophoresis performed in the generally known manner it can be demonstrated that the composition of the protein fractions obtained by the above process remains substantially uniform. This electrophoresis is carried out, e.g., with the membrane films marketed by Messrs. Schleicher and Schuell (makes: Membranfilmgesellschaft Goettingen) in a specially constructed unit cell e.g., from plastic material under standard conditions (temperature 22° C.; voltage: 18 volt/cm.; test duration: 2 hours; buffer: Veronal sodium, sodium acetate, 0.1 N-hydrochloric acid with ion strength 0.025 and pH 8.6; membrane size: 180 x 25 mm.; coating weight: 60γ). Staining with amido-black in the known manner renders the various protein bands visible, and the dry films, without having been rendered transparent, are evaluated e.g. in the "Analytrol" apparatus of Messrs. Beckman to form a proteinogram.

Thus, for example, the electrophoresis performed with fraction $Nx\ 12_{0.1}$ I has the composition shown in FIG. 1. The area A represents the specifically tumour-inhibiting portion of this protein fraction, whereas areas $B_1$ and $B_2$ are the portions of ballast substances, and the fraction C represents the atypically toxic, but not tumour-inhibiting share. It is therefore of importance to remove the ballast substances and above all the atypically toxic fraction. However, further purification by way of simple chromatography does not bring about a substantial change in the composition of the protein fraction. In addition, column chromatography is not very suitable for the preparative manufacture of active, tumour-inhibiting protein fractions.

The present invention is based on the unexpected observation that the ballast substances and especially the atypically toxic portion can be removed from protein fractions obtainable by the process of Belgian Patent No. 646,095, granted Apr. 3, 1964, to Frederic Vester, particularly the protein fractions $Nx\ 11_{0.04}$ or $Nx\ 12_{0.04}$, such as $Nx\ 11_{0.1}$, $Nx\ 11_{0.35}$, $Nx\ 12_{0.1}$ or $Nx\ 12_{0.35}$, or their purified fractions, such as $Nx\ 12_{0.1}$ I or $Nx\ 12_{0.35}$ I, by ultra-centrifuging an aqueous solution of these protein fractions and isolating the tumour-inhibiting protein fraction in a highly purified form from the sediment.

By means of the electrophoresis described above it can be demonstrated that the process of the invention is particularly suitable for accumulating the main portion of the ballast substances designated by $B_1$ and especially the atypically toxic share C from the protein fractions used as starting materials (cf. FIGURE 1) in the decantate (cf. FIGURE 2), which can be separated in a simple manner, whereas the highly purified tumour-inhibiting protein fraction accumulates in the sediment (cf. FIGURE 3); in the figures the ordinate shows the extraction.)

The ultra-centrifugation is carried out in a known manner, at as high a rotational speed as possible, advantageously, at over 20,000 revolutions per minute, while subjecting the solution used as starting material to a gravitational field of over 100,000 g, for example about 170,000 g. This field is maintained for several hours, e.g., for about 15 to 30 hours, working at a low temperature, that is to say at a temperature not much above $+10°$, e.g., between 0° and $+10°$ C., to conserve the protein fractions. If desired, the treatment on the ultra-centrifuge may be repeated and/or the resulting, purified protein fraction further purified by filtration, e.g., filtration under sterile conditions, by which an additional removal of ballast can be achieved.

The resulting, highly purified protein fraction can be stored in the lyophilized form; it is, however, advantageous to free it prior to the lyophilization operation by dialysis against water from inorganic constituents, especially sodium chloride.

The aqueous solution, to be used as the starting material in the present process, of the purified protein fractions obtained by the process disclosed in Belgian Patent No. 646,095, granted Apr. 3, 1964, to Frederic Vester, prepared for example by triturating the pre-purified protein fraction which may be used in the form of a salt precipitate, particularly an ammonium sulfate precipitate, with a small amount of water to free it as much as possible from any adhering salt, separating the undissolved protein material (e.g., by normal centrifugation at about 10,000 to 15,000 revolutions per minute) from the salt solution and dissolving the sediment residue in water and, if desired, dialyzing it against water or preferably against a salt or buffer solution, especially a physiological saline solution. The purified, salt-containing protein fraction may also be dissolved directly with water and the solution may be adjusted to the desired salt content by dialysis against water or a suitable salt solution. The solution obtained in this manner can then be immediately treated on the ultracentrifuge, though it is more advantageous to dilute it further either with water or with a suitable salt solution, especially physiological saline solution. In general, a solution containing 0.5 to 10%, preferably 1 to 5%, of protein is used for the treatment on the ultra-centrifuge.

The resulting highly purified protein fractions, which have been extensively freed, above all, from atypically toxic fractions, and inactive ballast, by the present process, obtained from the protein fractions $Nx\ 11_{0-0.4}$ or $Nx\ 12_{0-0.4}$, such as $Nx\ 11_{0.1}$, $Nx\ 11_{0.35}$, $Nx\ 12_{0.1}$ or $Nx\ 12_{0.35}$, as well as further purified fractions, such as $Nx\ 12_{0.1}$ I or $Nx\ 12_{0.35}$ I used as starting materials, constitute more especially the protein fractions designated as $Nx\ 11_{0-0.4}$ UZS, or $Nx\ 12_{0-0.4}$ UZS, such as $Nx\ 11_{0.1}$ UZS, $Nx\ 11_{0.35}$ UZS, $Nx\ 12_{0.1}$ UZS or $Nx\ 12_{0.35}$ UZS, as well as, for example, $Nx\ 12_{0.1}$ I UZS or $Nx\ 12_{0.35}$ I UZS. They are suitable for use in the treatment of cancerous diseases; for this purpose they can be used, for example, in the form of pharmaceutical preparations containing them in admixture or conjunction with organic or inorganic pharmaceutical excipients suitable for parenteral administration. The pharmaceutical preparations may, for example, take the form of dry ampoules. They may be sterilized and/or contain auxiliaries such as preserving, stabilizing, wetting or emulsifying agents, salts for regulating the osmotic pressure or buffers. They may also contain further therapeutically valuable substances.

The following examples illustrate the invention.

EXAMPLE 1

(1) While maintaining a temperature between 0° and +5° C., 33.2 g. of a protein precipitate, obtained from the eluate $Nx\ 12_{0.1}$ I (Example 6, Section 5b of Belgian Patent No. 646,095, granted Apr. 3, 1964, to Frederic Vester) by addition of aqueous ammonium sulphate solution to achieve a molarity of 3, are triturated with 15 ml. of water, whereupon the bulk of the adhering ammonium sulphate together with small amounts of protein passes into solution. The mixture is centrifuged at 0° C. for 15 minutes at 12,000 revolutions per minute, and the light-brown supernatant solution is decanted.

Water is added dropwise to the sediment until a transparent, gelatinous paste and subsequently a thinly liquid, dark-brown solution of a final volume 27 ml. has formed; 25 ml. of this solution are dialyzed for 16 hours in a stirring dialyzer against about 20 litres of an 0.9% aqueous solution of sodium chloride, to yield a dark-brown, clear solution containing 12.9% of protein.

(2) The above solution is diluted with 0.9% aqueous sodium chloride solution to a concentration of 2.6% and treated in an ultra-centrifuge (design: Analytical Spinco Centrifuge, Model E; insert: Rotor SW39; content of tube: 5 ml.) for 22 hours at a temperature of 7° C. and at 40,000 revolutions per minute; gravitational field: 170,000 g. A pale yellowish supernatant solution forms which is decanted, and a black-brown sediment of tarry consistency is obtained which constitutes the protein fraction $Nx_{0.1}$ I UZS 1 having a tumour-inhibiting action.

(3) The protein fractions of the starting material $Nx\ 12_{0.1}$ I (FIGURE 1), of the decantate $Nx\ 12_{0.1}$ I UZD (FIGURE 2) and of the sediment $Nx\ 12_{0.1}$ I UZS 1 (FIGURE 3) can be equalized by means of the electrophoresis described above; after staining with amido black and evaluation with the "Analytrol" apparatus of Messr. Beckman they reveal the following compositions:

| | Starting material, $Nx\ 12_{0.1}$ I | Decantate, $Nx\ 12_{0.1}$ I UZD | Sediment $Nx\ 12_{0.1}$ I UZS 1 | Sediment $Nx\ 12_{0.1}$ I UZS 2F |
|---|---|---|---|---|
| Total protein content: | | | | |
| In mg | 126.5 | 31.5 | 95 | 66 |
| In percent | 100 | 25 | 75 | 52.5 |
| Ballast: | | | | |
| Area $B_1+C$ | 22.9 | 47.4 | 13.0 | 6.8 |
| Area $B_2$ | 18.3 | 11.9 | 17.6 | 20.3 |
| Active fraction, area A | 58.8 | 40.7 | 69.4 | 72.9 |

(The areas A, ($B_1+C$) and $B_2$ are shown in percent of the total area.)

In this connection it is specially significant, that the atypically toxic fraction C (see FIGURE 1) and the adjoining inactive ballast substances $B_1$ are contained in the decantate.

(4) If desired, the sediment can be redissolved as described under (1) above in an 0.9% aqueous sodium chloride solution and this solution once more treated in the ultracentrifuge and then filtered under sterile conditions through a cellulose acetate membrane to achieve in fraction $Nx\ 12_{0.1}$ I UZS 2F a complete separation of the component C (FIGURE 4). The resulting sediment, obtained either by the method described under (2) above or after repeated ultra-centrifugation and subsequent filtration, can be lyophilized, preferably after first having dialyzed a solution of the sediment in an 0.9% sodium chloride solution against plain water. In the form of the dry lyophilizate the preparation can be stored.

EXAMPLE 2

(1) 22.0 g. of the ammonium sulphate precipitate from the eluate $Nx\ 12_{0.35}$ I (see Example 1 of Belgian Patent No. 646,095, granted Apr. 3, 1964, to Frederic Vester) are dissolved as described in Example 1 by careful addition of water (final volume: 20 ml.) and then redialyzed against an 0.9% aqueous sodium chloride solution.

(2) The above solution is diluted to a concentration of 1.7% by adding more 0.9% aqueous sodium chloride solution and then exposed in an ultra-centrifuge (preparative ultra-centrifuge, model L, using a preparative rotor, type 30; [Messrs. Beckman/Spinco]) for 24 hours at 5° C. and 30,000 revolutions per minute to a gravitational field of 105,000 g.

(3) The electrophoresis of the starting material, of the sediment and of the decantate performed as described in Example 1, reveals the following values:

| | Starting material, $Nx\ 12_{0.35}$ I | Decantate, $Nx\ 12_{0.35}$ I UZD | Sediment, $Nx\ 12_{0.35}$ I UZS |
|---|---|---|---|
| Protein content: | | | |
| In mg | 579 | 259 | 320 |
| In percent | 100 | 44.7 | 55.3 |
| Sediment: | | | |
| Area $B_1+C$ | 21.1 | 34.3 | 7.3 |
| Area $B_2$ | 18.7 | 18.8 | 22.0 |
| Active fraction, area A | 60.2 | 46.8 | 70.7 |

(The areas A, $B_1+C$ and $B_2$ are shown in percent of the total area.)

(4) Solution of the sediment, dialysis against plain water and lyophilization converts the enriched protein fraction $Nx\ 12_{0.35}$ I UZS into a storable dry form.

EXAMPLE 3

(1) The solution of the protein fraction $Nx\ 12_{0.1}$, obtained after salting-in with an 0.1 N-aqueous ammonium sulphate solution as described in Example 6 of Belgian Patent No. 646,095, granted Apr. 3, 1964, to Frederic Vester, is subjected to a so-called "DEAE-Sephadex-Block" filtration. Ammonium sulphate is added to the filtrate until a molarity of 3 has been reached, and the resulting protein precipitate is dissolved as described in Example 1 in a small amount of water and then redialyzed against an 0.9% aqueous sodium chloride solution.

(2) The solution is diluted with an 0.9% aqueous sodium chloride solution to a protein content of 2% and then exposed in an ultracentrifuge at 7° C. for 24 hours to a gravitational field of 170,000 $g$.

(3) The electrophoresis of the decantate and of the sediment reveals that the latter contains the tumour-inhibiting fraction in an enriched form, practically free from ballast and especially from the atypically toxic fraction, whereas the decantate contains the superfluous ballast and the atypically toxic fraction.

(4) By redialyzation and lyophilization the resulting tumour-inhibiting protein fraction Nx $12_{0.1}$ UZS can be converted into a storable form.

What is claimed is:

1. In a process in which clear press juice from a member selected from the group consisting of Viscum or Loranthus species of mistletoe freed from its sludge-like impurities, or an equivalent aqueous extract, as well as dialysates or the dry-substances thereof, are salted out with an aqueous ammonium sulphate solution, and the protein fraction obtained at an ammonium sulphate molarity from about 1 to 1.9 is dialyzed against water, and, if desired, the water-insoluble portion of the retentate is salted-in with an aqueous ammonium sulphate solution or another salt solution up to a maximum molarity of 0.4, the improvement in which an aqueous solution so obtained containing 0.1% to 10% of a protein fraction is ultracentrifuged at over 20,000 revolutions per minute and a gravitational field of over 100,000 $g$ and the tumour-inhibiting protein fraction is isolated from the sediment, said process being carried out at a temperature below 10° C.

2. Process according to claim 1, wherein the protein fraction resulting when the water-insoluble portion of the retentate is salted-in with an aqueous ammonium sulphate solution or another salt solution up to a maximum molarity of 0.4 is purified on an adsorbent, advantageously over 2 steps, namely, first on a block and then on a column of the adsorbent.

3. Process according to claim 2, wherein the adsorbent is a polydextran gel.

4. Process according to claim 1, wherein the solution is exposed to a gravitational field of about 170,000 $g$.

5. Process according to claim 1, wherein ultra-centrifugation is maintained during 15-30 hours.

6. Process according to claim 1, wherein an aqueous solution containing 1% to 5% of the protein fraction is used as the starting material.

7. Process according to claim 1, wherein the solution of the protein fraction used as the starting material is prepared by triturating a member selected from the group consisting of a purified protein fraction and a purified protein fraction in the form of a salt precipitate, with a small amount of water to free it as much as possible from the salt, separating the undissolved protein material by centrifugation and dissolving it in water, and dialyzing the solution against a member selected from the group consisting of water and a salt solution.

8. Process according to claim 1, wherein the solution of the protein fraction used as the starting material is prepared by dissolving the protein fraction with a member selected from the group consisting of water and a salt solution and dialyzing the solution against a member selected from the group consisting of water and a salt solution to obtain the desired salt content.

References Cited

UNITED STATES PATENTS 3,394,120   7/1968   Vester _____ 260—112

FOREIGN PATENTS 646,095   4/1964   Belgium.

OTHER REFERENCES

Hoppe-Seylers Zeitschrift Fur Physiologische Chemie, Band 324, Mar. 28, 1961, pp. 262–281, Selawry et al.

Arzneimiffel Forschung, Jan. 13, 1963, pp. 29–32, Winterfeld et al.

Alexander, Analytical Methods of Protein Chemistry, vol. I, 1959, pp. 4–7 and 9–19, vol. III, 1961, pp. 121–126, 161–162.

Neurath, The Proteins, vol. III, 2nd edition, published Feb. 11, 1965, pp. 27–31 and 77–80.

Chem. Abstracts, vol. 53, 1959, 18282.

WILLIAM H. SHORT, Primary Examiner

H. SCHAIN, Assistant Examiner

U.S. Cl. X.R.

424—177 195